United States Patent [19]

Ganung et al.

[11] Patent Number: 4,470,177
[45] Date of Patent: Sep. 11, 1984

[54] FIRE HOSE CLAMP

[76] Inventors: George Ganung, R.F.D. #1, New Hartford, Conn. 06057; Alphonse Nagourney, P.O. Box 3051, 905 Noble Ave., Bridgeport, Conn. 06605

[21] Appl. No.: 424,019

[22] Filed: Sep. 27, 1982

[51] Int. Cl.³ .............................................. B65D 63/00
[52] U.S. Cl. ........................................ 24/270; 24/273; 24/280; 248/75; 248/76; 285/61; 285/419
[58] Field of Search ................. 24/270, 273, 279, 280, 24/249 DP, 263 DP, 20 R, 265 CD, 262; 285/61, 364, 373, 419; 248/75, 76; 294/15, 16; 292/341.18, 113

[56] References Cited

U.S. PATENT DOCUMENTS

| 513,727 | 1/1894 | Potts | 24/71 SK |
| 596,689 | 1/1898 | Aungst . | |
| 877,012 | 1/1908 | Sullivan | 294/16 |
| 1,179,645 | 4/1916 | Mouldin | 292/341.18 |
| 1,619,287 | 3/1927 | Charter . | |
| 1,625,255 | 4/1927 | Hudgins . | |
| 1,638,269 | 8/1927 | Mullinack . | |
| 3,056,571 | 10/1962 | Schofield et al. . | |
| 3,105,281 | 10/1963 | Doherty | 24/249 DP |
| 3,309,130 | 3/1967 | Arrowood | 24/249 DP |
| 3,363,288 | 1/1968 | Lange et al. | 24/68 SK |
| 4,272,871 | 6/1981 | Weinhold | 24/270 |
| 4,296,534 | 10/1981 | Nagano | 24/270 |
| 4,336,637 | 6/1982 | Patterson | 24/249 DP |
| 4,381,585 | 5/1983 | Morel | 24/270 |
| 4,382,570 | 5/1983 | Craig | 24/270 |

Primary Examiner—Victor N. Sakran
Attorney, Agent, or Firm—Arthur T. Fattibene

[57] ABSTRACT

This disclosure is directed to a fire hose clamp provided with a hand grip for firemen for use on a fire hose when fighting a fire to resist the back pressure acting on the hose and thereby provide for greater ease in directing the nozzle of the hose toward the fire. The fire hose clamp comprises a pair of complementary housing sections hingedly connected to a swing between a clamping and unclamping position, and which is provided with an anti-slip liner and a latching mechanism for rendering the clamp to be positively secured to the hose in a readily releasable manner and which the latching mechanism can be adjusted so as to adapt the clamp to fire hoses of varying diameters. Handles are provided on the clamp to provide a hand grip for firemen when fighting a fire. A support hook may be connected to the clamp to facilitate storage and/or to form a support for the hose and clamp as it is being pulled up a ladder when fighting a fire.

1 Claim, 5 Drawing Figures

FIG. 5
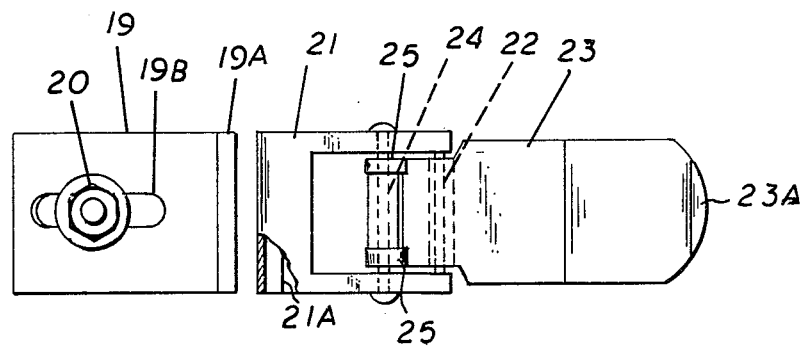
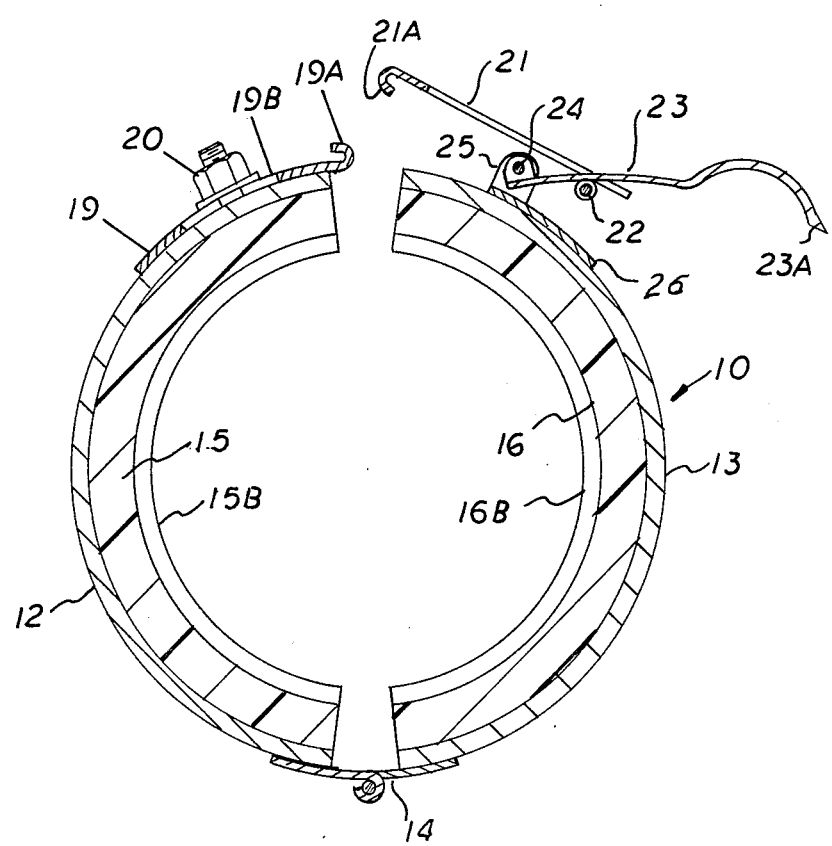
FIG. 4

FIRE HOSE CLAMP

PROBLEMS & PRIOR ART

A standard type of fire hose when under pressure is always very hard to handle. It is heavy, stiff, and slippery and it's outside diameter of approximately three inches results in a very poor grip. When operating at water pressure of 50-100 pounds, it usually requires at least three men to resist the backward force of the water. As a result, the nozzleman in addition to directing the hose has to expend a considerable amount of energy in resisting the back pressure of the water acting on the hose. This presents a considerable difficulty in directing the nozzle. The problem is further compounded when the hose has to be pulled up stairs or up a ladder. While efforts to provide means for facilitating the holding of hoses as evidenced by U.S. Pat. Nos. 596,689; 877,012; 1,625,255 and 3,056,571 have been made, such efforts apparently have not been generally adopted. Consequently, fire fighters are still fighting fire with hoses which are difficult to handle and/or control.

Other types of hose clamps have also been noted such as those disclosed by U.S. Pat. Nos. 1,619,287; 1,638,269 and 4,272,871. However, clamps such as disclosed by these patents are used for effecting hose repairs and do not function as hose grips in the manner contemplated by this invention.

OBJECTS

It is therefore an object of this invention to provide a relatively simple and positive acting hose clamp which will function as a hand grip to facilitate the handling of a hose in fighting a fire.

Another object is to provide a fire hose clamp which can be detachably connected to any portion of a fire hose along the length thereof.

Another object is to provide a fire hose clamp that can be readily adjusted to fit fire hoses of varying diameters.

BRIEF SUMMARY OF THE INVENTION

The foregoing objects and other features and advantages are attained by a fire hose which comprises a pair of complimentary housing sections which are hingedly connected along adjacent end portions to swing between an open and closed position. A resilient liner member is disposed adjacent to the inner surface of the respective housing sections and which liner terminates in a collar portion which in the operative position will function as a cushion or protection against serious injury should control over the hose be lost. A latching mechanism is provided to secure the respective sections in a closed or clamped position on the hose. The latching mechanism includes a catch and a complimentary latch, the latter being associated with an actuator which is hingedly connected to one of the housing sections. To effect adjustment of the clamp assembly to a hose of a given diameter, the catch is provided with an elongated slot whereby it can be rendered readily adjustable relative to its associated housing section. Handgrips are secured to each section to provide a handle for the fire hose. If desired, a hook may also be secured to one of the housing sections to provide a support for the clamp or the fire hose secured thereto when pulling the hose up a ladder and/or for stowing the clamp.

FEATURES

A feature of this invention resides in the provision of a fire hose clamp which has an adjustable latching mechanism whereby the clamp can be fitted to hoses of varying diameters.

Another feature of this invention is to provide a fire hose clamp with a liner arranged so that it will function as a bumper or cushion to prevent serious injuries if control of the hose is lost.

Another feature is to provide a readily detachable hose clamp that can be positively secured to any portion of the hose along the left thereof.

Another feature resides in the provision wherein the hose clamp is relatively simple in construction, inexpensive to manufacture, and which is positive in operation.

IN THE DRAWING

FIG. 4 is a cross section view of the clamp of FIG. 1.

FIG. 5 is a detailed plain view of the latching mechanism as shown in FIG. 4.

DETAIL SPECIFICATION

Figure 1:
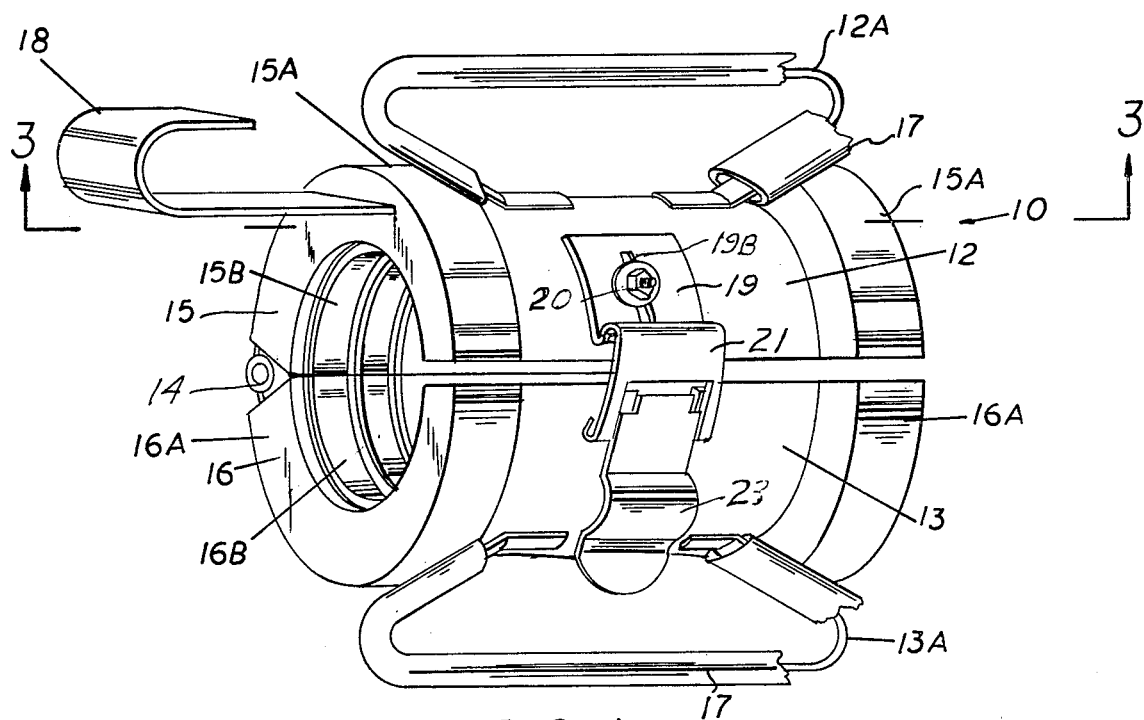
FIG. 1 is a perspective view of the hose clamp embodying the invention.
Figure 2:
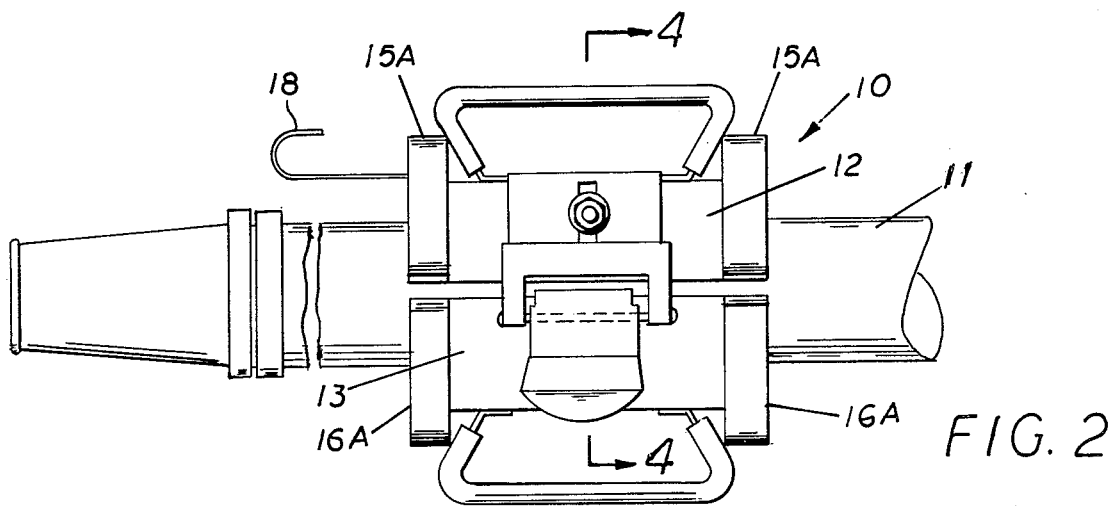
FIG. 2 is a plain view of the hose clamp of FIG. 1.
Figure 3:
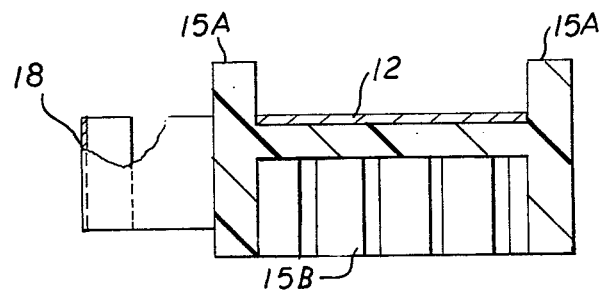
FIG. 3 is a sectional view taken along line 3—3 on FIG. 1.

Referring to the drawings there is illustrated a hose clamp 10 embodying the invention which is particularly adapted for use with a fire hose 11. As shown, the clamp assembly 10 includes a pair of arcuate shaped housing sections 12 and 13 which are hingedly connected along their adjacent edges by a hinge 14. The respective housing sections 12 and 13 are formed of a suitable rigid material as for example metal or reinforced plastic material with a curvilinear cross-section so as to accommodate a fire hose when under pressure. Each housing section 12 and 13 is provided with a liner 15 and 16 respectively, each of which is provided with a laterally extending collar 15A and 16A extending beyond the ends of the housing section at each end thereof. The liner 15 and 16 is formed of a resilient material such as rubber or foam plastic and thus functions an anti-slip member to positively grip the clamp to the hose and which further functions as a protection against injury in the event the hose should whiplash in the event control over the hose is lost. Connected to each section 12 and 13 is a handle 12A and 13A to provide a grip for the hose. If desired the respective handles 12A and 13A may be provided with a covering or sleeve 17 to facilitate gripping the handles 12A and 13A.

If desired, a hook 18 is connected to one of the housing sections, e.g. to housing section 12 to extend longitudely of the clamp assembly 10. The hook 18 thus functions as a support for the clamp for either stowing the clamp or when in operation to support the hose as it is being pulled up a ladder. The arrangement is such that the hook can be rested on the rung of a ladder as the firemen ascends or descends the ladder.

To securely clamp the respective sections 12 and 13 to the hose 11, a latching mechanism is provided. The illustrated latching mechanism comprises a catch 19 in the form of a plate which is connected to one housing section, e.g. 12. The free end of the catch 19 is provided with an inturned lip 19A. The catch 19 is also provided with an elongated slot 19B whereby it can be adjustably secured to the housing section 12. A fastener 20 is provided to secure the catch in an adjusted position. As it will become apparent, the adjusting of the catch 19 relative to it's housing section 12 will enable the clamp assembly 10 to be adjusted to hoses of varying diameters.

A complimentary latch 21 is operatively connected to the other section 13. The latch 21 is hingedly connected about a hinge pin 22 connected to the actuator or operating lever 23, the latter in turn being hingedly connected about a hinge pin 24 which extends transversely between a pair of bracket ears 25 which extend from a bracket plate 26. The free end of the latch 21 is provided with an inturned lip 21A to interlock with the lip 19A of the catch 19 in the operative or locked position. As best seen in FIGS. 4 and 5, the hinge pin 22 about which the latch 21 is hingedly connected to the actuator or lever 23 is disposed intermediate or between the fulcrum or hinge 24 of the actuator and it's free end 23A. Thus it will be apparent that when the actuator 23 is raised or moved away from the associated housing section, the latch is disengaged from the catch 19. When the actuator 23 is moved toward the housing section, the latch engages the catch to draw the two housing sections 12 and 13 tightly against the hose. The arrangement is such that when the actuator 23 is moved toward the housing in clamping position it will pass through dead center thereby firmly clamping the housing sections to the hose.

It will be understood that the internal surface of the liners 15 and 16 are provided with suitable embossments such as ribs or the like 15B, 16B to mesh with the webbing or surface of the hose to provide a firm frictional grip therebetween.

In operation it will be apparent that with the hose clamp secured to the hose, two or more firemen can firmly secure or hold the hose by handles 12A and 13A and thereby relieve the nosslemen from fighting back pressure, and thus allows the nozzlemen to concentrate on directing the nozzle towards the fire. The clamp assembly 10 when placed on the hose also enables additional firemen to help in holding the hose as the end of the clamp provides an abuttment against which an extra fireman can better grasp the body of the hose if necessary.

From the construction described, the clamp assembly can be readily secured to a hose even when charged or under pressure. The clamp can be placed anywhere along the length of the hose as needed.

While the invention has been described with respect to a particular embodiment, it will be readily understood and appreciated that variations and modifications may be made without departing from the spirit or scope of the invention.

What is claimed is:

1. A fire-hose clamp adapted to be rendered readily attachable and detachable to a fire hose to facilitate handling and directing a fire hose when under pressure comprising a pair of complimentary housing sections adapted to circumscribe the circumference of a fire hose, means for hingedly connecting together adjacent end portions of said complimentary housing sections for swinging said housing sections between an open and closed position, a resilient liner connected to the inner surface of each of said housing sections to provide an anti-slip surface for frictionally securing therebetween a hose in the operative closed position, said liner each having an arcuate collar disposed adjacent each end of its respective housing sections, said collar extending laterally beyond the surface of its respective housing section so as to space a hose off a supporting surface and to provide protection against injury if control of the hose under pressure is lost, a handle means connected to each housing section to provide a grip for firemen to resist the back pressure forces acting on a hose, complimentary latching means provided for predetermined range of hose diameter connected to said housing sections for maintaining said housing sections securely clamped onto a fire hose in the operative position and for rending said housing sections adjustable to hoses of varying diameters within said predetermined range of hose diameters, said complementary latching means including a catch secured to one of said housing sections opposite said hinge means, a latch, a latch actuator, a latch actuator pivot means pivotally connecting said latch actuator to the other housing section for pivoting between a latch closing and latch opening position, said latch having one end pivotally connected to said latch actuator intermediate said pivot means and the free end of said latch actuator, said catch and said latch having complimentary inturned lip portions on their respective free end portions for interlocking said latch to said catch in the closed position thereof, means adjustably positioning said catch relative to its housing section whereby said housing sections can be adjusted to accommodate fire hoses of varying diameters, said adjusting means including an elongated slot formed in said catch that extend circumferentially of its respective housing section, and a means for securing said catch to its respective housing section in the adjusted position thereon.

* * * * *